US008783148B2

(12) United States Patent
Weibelt

(10) Patent No.: US 8,783,148 B2
(45) Date of Patent: Jul. 22, 2014

(54) ROTARY DIE CUTTER INSERT

(76) Inventor: Bruce Weibelt, Huntington Beach, CA (US)

( * ) Notice: Subject to any disclaimer, the term of this patent is extended or adjusted under 35 U.S.C. 154(b) by 154 days.

(21) Appl. No.: 13/429,376

(22) Filed: Mar. 24, 2012

(65) Prior Publication Data

US 2012/0285306 A1 Nov. 15, 2012

Related U.S. Application Data

(60) Provisional application No. 61/484,837, filed on May 11, 2011.

(51) Int. Cl.
*B23D 25/00* (2006.01)

(52) U.S. Cl.
USPC ................................ 83/331; 83/123; 493/373

(58) Field of Classification Search
USPC ........... 83/532, 563, 331, 116, 117, 123, 124, 83/343, 346, 347; 493/342, 373
See application file for complete search history.

(56) References Cited

U.S. PATENT DOCUMENTS

| | | | | |
|---|---|---|---|---|
| 4,896,573 | A * | 1/1990 | Kapolnek | 83/117 |
| 5,111,725 | A | 5/1992 | Simpson et al. | |
| 5,365,815 | A * | 11/1994 | Pfaff, Jr. | 83/154 |
| 5,826,475 | A * | 10/1998 | Mysliwiec | 83/116 |
| 6,230,597 | B1 | 5/2001 | Baba et al. | |
| 6,250,189 | B1 * | 6/2001 | Mysliwiec | 83/37 |
| 6,644,153 | B1 * | 11/2003 | Gordon | 83/27 |
| 6,925,918 | B1 * | 8/2005 | Bunge | 83/116 |
| 6,966,245 | B1 * | 11/2005 | Simpson | 83/27 |
| 7,017,463 | B1 * | 3/2006 | Simpson | 83/117 |
| 7,044,040 | B1 * | 5/2006 | Smith | 83/115 |
| 7,111,534 | B1 * | 9/2006 | Simpson | 83/27 |
| 8,166,858 | B2 * | 5/2012 | Luquette | 83/115 |

* cited by examiner

*Primary Examiner* — Omar Flores Sanchez
(74) *Attorney, Agent, or Firm* — Curtis L. Harrington; Harrington & Harrington

(57) ABSTRACT

The provision of a hardened elevated surface within the a inside die cutting area of a cutting rule to limit and control the extent to which die cut scrap processed corrugated fiberboard sheet material can position itself within the area within the cutting rule before ejection limit the tendency for instability within the cutting rule after the die cut is achieved and to better control the ejection of the scrap processed corrugated fiberboard sheet material to better eliminate unwanted scrap downstream of the die cutting process. Eliminated scrap reduces malfunctions in further processing and helps to eliminate health and contamination hazards in the finished corrugated fiberboard sheet product.

14 Claims, 3 Drawing Sheets

ROTARY DIE CUTTER INSERT

This is a continuation of Provisional Patent No. 61/484,837 filed May 11, 2011.

FIELD OF THE INVENTION

The present invention relates to improvements in the field of high speed rotary die cutters especially for use in cutting corrugated paperboard such as is used in paper products such as boxes, and more specifically, but not limited to use in the high speed Mitsubishi EVOL die cutter to enhance the ability to control scrap separation to enhance the probability of producing a scrap-free product.

BACKGROUND OF THE INVENTION

Rotary die cutting machines (not shown in the drawings) have been publicly known. In these types of cutters a frame is used to provide powered rotation to a die cut cylinder and an anvil cylinder. A blanking die, which may be provided in sections, is attached to the die cut cylinder to form a blanking die roll and rotated together with the anvil cylinder. The rotary die cutting machine is commonly used in the manufacture of cartons or boxes to trim or otherwise cut corrugated paperboard stock to desired shapes, provide them with apertures and cutouts. Cutting is performed by a cutting rule that extends radially outwardly from the blanking die roll.

The rotary die cutting machine die roll may also include at least one and usually a plurality of blocks of so-called “scrap ejection” and “material separation” rubber. The rubber blocks are mounted upon and extend outwardly from the curved surface of the die boards which comprise the die roll, at advantageous locations and often closely adjacent to various cutting rules. In their uncompressed condition the rubber blocks project radially outwardly, and often beyond the height of the toothed cutting edge of the cutting rule. The rubber blocks may be compressed as they pass into and through the close space between the die roll and the anvil cylinder. As they pass from such close spaced relationship, the rubber blocks return outward movement to help separate the freshly cut corrugated fiberboard sheet product from the areas occupied by the cutting rule. Where a hole is cut, for example, the cutting rule will be arranged in a somewhat continuous closed line to form an enclosed cut. The rubber blocks are especially helpful in removing the freshly cut corrugated fiberboard sheet product from these shapes of cutting knives.

The use of rubber blocks is insufficient to assist scrap rejection in a high speed Rotary die cutting machine. Even where a clean cut takes place, and even with many precise feed controls and the like, in both low speed and high speed rotary die cutters the process of cutting out a portion of the rejection of scrap needs more control. In some dies an ejector mechanism is used, which is a cantilevered arm having a pivot connected first end and a second end extending partially behind the die blade and which has limited movement to assist in dislodging scrap. In some cases the cantilevered arm receives an assist from within the die cut cylinder and communicating through the blanking die with a cam mechanism. In other die cut cylinders, an ejector mechanism may rely upon centrifugal force, or interaction with the anvil cylinder (either a rebound action or a positive compression action), and may also use springs or other rubber blocks. The number of combinations and configurations to provide an “assist” to scrap rejection are many.

Even with finely tuned reactive structures assisting in the rejection of scrap, the certainty with which this scrap material is eliminated as soon as possible after it is cut from corrugated fiberboard sheet is not yet achieved. Corrugated fiberboard sheet scrap may be unintentionally carried with the corrugated fiberboard sheet product to a stacking machine downstream from the operation of the anvil cylinder and blanking die roll.

The scrap can make its way into the sheets of cut material in one of two ways. The first way for it to make it into the sheets of cut material is for an incomplete cut to occur. The completeness of cut can be adjusted by adjusting the pressure and penetration of the cutter into the passive polymeric roller, as well as by periodic sharpening of the cutting rules. The second, and traditionally less controllable way that scrap can make it into the finished product is by failure of the scrap to be rejected from within the cutting rule.

The presence of scrap within cut cardboard is costly and hazardous. Where the presence of scrap is prominent enough to cause the producer of the cut cardboard to visually notice it, it results in additional handling, and more personnel than would otherwise be needed. Where the scrap is present in the die cut and stacked cardboard, it disrupts further handling machinery. Further handling machinery may include box assembly, box manipulation and filling and box closure and sealing. Most of the automated processes which act upon die cut and stacked cardboard involve vacuum pickup devices which rely upon vacuum cups to cleanly abut and engage the die cut stacked cardboard for lifting, manipulation, repositioning and the like. One small piece of scrap can prevent vacuum engagement and cause a machine to jam.

The most expensive and highest speed processing types of machinery have a higher reliance upon a consistent product feed stock which can be engaged consistently at high speed and speedily manipulated. The presence of scrap within cut cardboard can result in high numbers of ruined constructed structures or can cause the machinery to shut down until repaired. Where capacity of final production machinery is high, even a 10 minute shut down can result in significant loss of production. A thirty second malfunction can ruin high numbers of products resulting a significant waste.

Corrugated fiberboard sheet scrap may therefore eventually wind up within the corrugated fiberboard sheet product, carton, box or processed the like formed in the die cutting operation. Unwanted scrap downstream of the die cutting process can have very undesirable consequences, particularly when the carton or box is used for foods, such as pizza, which can be contaminated by the scrap paperboard. Scrap contamination of the carton or box can also ensue when the blocks of product ejection rubber do not extend rapidly enough, as they exit from space between the die roll and anvil cylinder of the apparatus, to prevent the paperboard stock from advancing beneath the trimmed scrap, and then being transported by the cut paperboard stock to the packing machine.

Proper rejection means that the cutting rule area should be able to reject the scrap just after cutting occurs and after the cut sheet moves on to the remainder of the cutting process, but before the cutting rule is brought back into contact with a fresh area of material to be cut. Any scrap which remains within the cutting rule will be doubled at the next cutting cycle. Doubling can cause scrap to be transmitted to the final product by forming an incomplete cut. An incomplete cut can cause a “shad” effect and draw scrap into the finished product. Doubling can also cause scrap to remain within the blade area over several cutting cycles.

Correct operation dictates that each piece of die-cut scrap be held only long enough for the processed sheet material to pass away from the cutting die without any entrained scrap, and for any scrap within the cutting die to be rejected and expelled as soon as possible after clearing the processed sheet in order that the cutting die be "emptied" and ready for the next cutting operation. Because there are so many variables, including die size, blade depth, ejector action, and especially paper type, surface and corrugation, finding a solution which works to broadly contribute to a significant reduction of the possibility of the rejection of scrap outside of the desired range of operation of the die wheel, has not heretofore been devised.

SUMMARY OF THE INVENTION

A hardened insert is positioned within the cutting rule area of a rotary cutting die to limit and control the extent to which die cut scrap can position itself within the area within the cutting rule. Further, it has been found to be advantageous in some applications to provide the outwardly exposed surface of the hardened insert with ribs and grooves which have been found to even further limit the tendency for instability within the cutting rule after the die cut is achieved and to better control the ejection of die cut scrap and thus significantly reduce the instance of die cut scrap making its way into finished die cut product. The invention has been found to work well with the high speed Mitsubishi Evol die cutters.

Using the Mitsubishi Evol die cutter as a working example, these machines use curved plywood die cut cylinder sections having a thickness from about one half inch (0.500) to about eleven sixteenths of an inch (0.6875) thick and which conventionally have three visually prominent structures, namely a die cutting rule, a material carve-out for accommodating a scrap ejector arm which extends underneath the die cutter rule cutting rule to assist in pushing scrap out of the area within the die cutting rule, and resilient polymeric blocks placed around the die cutting rule to assist in disengaging the cardboard material around the ruled cut away from the blanking die roll. Assistance in freeing the uncut surrounding corrugated fiberboard sheet material will help to eliminate unwanted engagement between the die cutting rule and the processed corrugated fiberboard sheet material at the earliest moment when the processed corrugated fiberboard sheet material is free of engagement between the blanking die roll and the anvil cylinder.

The invention involves a relatively hard wood or plastic insert that may be between one eighth of an inch (0.125 inches) thick and seven sixteenth of an inch (0.4375 inches) thick. The inventive insert is supported within the cutting rule area, but it is preferable for a portion of the inventive insert to be cut away sufficient to accommodate a scrap rejecter if present. The inventive insert will preferably, but need not have a bottom curvature which generally tracks the curvature of the blanking die, such as an inner radius to match the curvature of the blanking die and an outer radius slightly greater than the radius of the curved support since the insert will be less than one half inch in thickness. A flat insert is possible but may require more threaded members for its stability. Conversely, it may bend, but is not expected to have as constant of a height with respect to the upper edge of the cutting rule as would otherwise be the case if the insert were curved on its bottom side evenly with a similar curvature of its top side and outer surface at mounting.

The inventive insert also helps to stop the cutting rule from bending and flexing in a high speed rotary die cutting environment. In typical cutting rule, the bottom of the cutting rule is inserted into narrow slots in the curved blanking die section. However to accommodate a scrap ejector, some of the underlying wood or plastic material in the curved blanking die section support may be carved out to make room for a scrap ejector lever arm. The material removed to accommodate the scrap ejector lever arm, especially at the point where the scrap ejector lever arm underlies the die cutting rule, may provide a less supported, less secured rule, and the insert of the invention may be positioned to help to stabilize and support those portions of the cutting rule.

The preferred environment for the inserts of the invention is the Mitsubishi Evol die cutters which have blanking die roll and the anvil cylinder having a diameter typically between ten inches and twelve inches. The use of one half inch (0.500) to eleven sixteenths of an inch (0.675) thick curved plywood blanking die sections will increase the diameter of the die cut cylinder only slightly to result in a blanking die roll increased in diameter by not more than 1.35 inches overall. The inventive wood or plastic or nylon insert of the invention that is between one eighth of an inch (0.0125) and seven sixteenth (0.4375) thick is not believed to make any significant increase on the combined diameter of the blanking die roll.

However, the inventive inserts within the area of the cutting rule formed in a continuous shape to form of a die board cut outs, neglecting any carved out areas due to the presence of a scrap ejector lever arm, reduces the distance between the surface of the blanking die roll within the die board cut out area to the height of the cutting rule by the aforementioned one eighth of an inch (0.0125) to seven sixteenth (0.4375) thickness of the inventive insert.

Most of the supporting curved die cut cylinder sections are typically supplied with a material which is either one half inch (0.500) or five eighths of an inch (0.6875). A typical cutting rule has an overall height of about 0.990 of an inch and the cutting rule is typically pressed into the material (typically wood) of the supporting curved die cut cylinder section up to the thickness of the supporting curved die cut cylinder section. Thus the cutting rule height may be either 0.990–0.500 to equal 0.490 of an inch high to 0.990–0.6875 to equal 0.3025 of an inch. Comparing the aforementioned one eighth of an inch (0.0125) to seven sixteenth (0.4375) thickness of the inventive insert gives a corresponding range of reduction in the height of the supporting curved die cut cylinder section to the top of the exposed cutting rule.

The minimum and maximum percentage reduction in the distance from the height of the supporting curved die cut cylinder section to the top of the exposed cutting rule have been determined using a one half inch (0.500) supporting curved die cut cylinder section, but the workable range limits can be adapted to other supporting curved die cut cylinder sections and other heights of die cutting rule. The minimum percentage distance from the height of the supporting curved die cut cylinder section to the top of the exposed cutting rule would be, for a 0.125 inch thickness insert, a reduction in height above curved die cut cylinder section protruding 0.490 inches high would be 0.125/0.490 or 25.51% reduction in height. Also in the case of a The maximum percentage distance from the height of the supporting curved die cut cylinder section to the top of the exposed cutting rule would be, for a 0.4375 inch thickness insert, a reduction in height above curved die cut cylinder section protruding 0.490 inches high would be 0.4375/0.490 or 89.28% reduction in height. The resulting smaller volume of this area within the rule cutting die board cutout area may also tend to crush, compress, or otherwise deform the portion of the scrap cut from the blanked corrugated fiberboard sheets. An insert also gives the cutting rule increased lateral support. The added lateral support afforded a cutting rule embedded 0.625 by an additional 0.125 height insert is 0.125/0.625 or twenty percent. The added lateral support afforded a cutting rule embedded 0.500 by an additional 0.4375 height insert is 0.4375/0.500 or eighty seven and a half percent additional support.

It has also been discovered that the provision of a surface pattern on the upper surface of the insert which contacts the blanked corrugated fiberboard sheets may give even more control in rejection of scrap. The surface pattern may preferably be ribbed and arranged with the ribs extending perpendicularly to the path of travel of the blanking die roll as it turns in time with the anvil cylinder. It has been suggested that one mechanism by which the hardened insert helps to control scrap is the ability to hold the scrap to be rejected within the area of the ruled die board cutout circumscribed area until the moment that it is to be positively rejected, rather than allowing it to escape from this same area prematurely where it has a higher probability of finding its way into the blanked corrugated fiberboard sheets.

It may also be that the use of ribs provides a momentary accordion-like slight forced stretching or contraction with stretching which may momentarily and slightly engage the edge of the cutting rule for a moment sufficient to enable scrap rejection at the correct moment and after the blanked corrugated fiberboard sheets are further downstream in the manufacturing process, or at least separate enough from the cutting rule that scrap rejection will be able to occur in a direction well away from the blanked corrugated fiberboard sheets.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
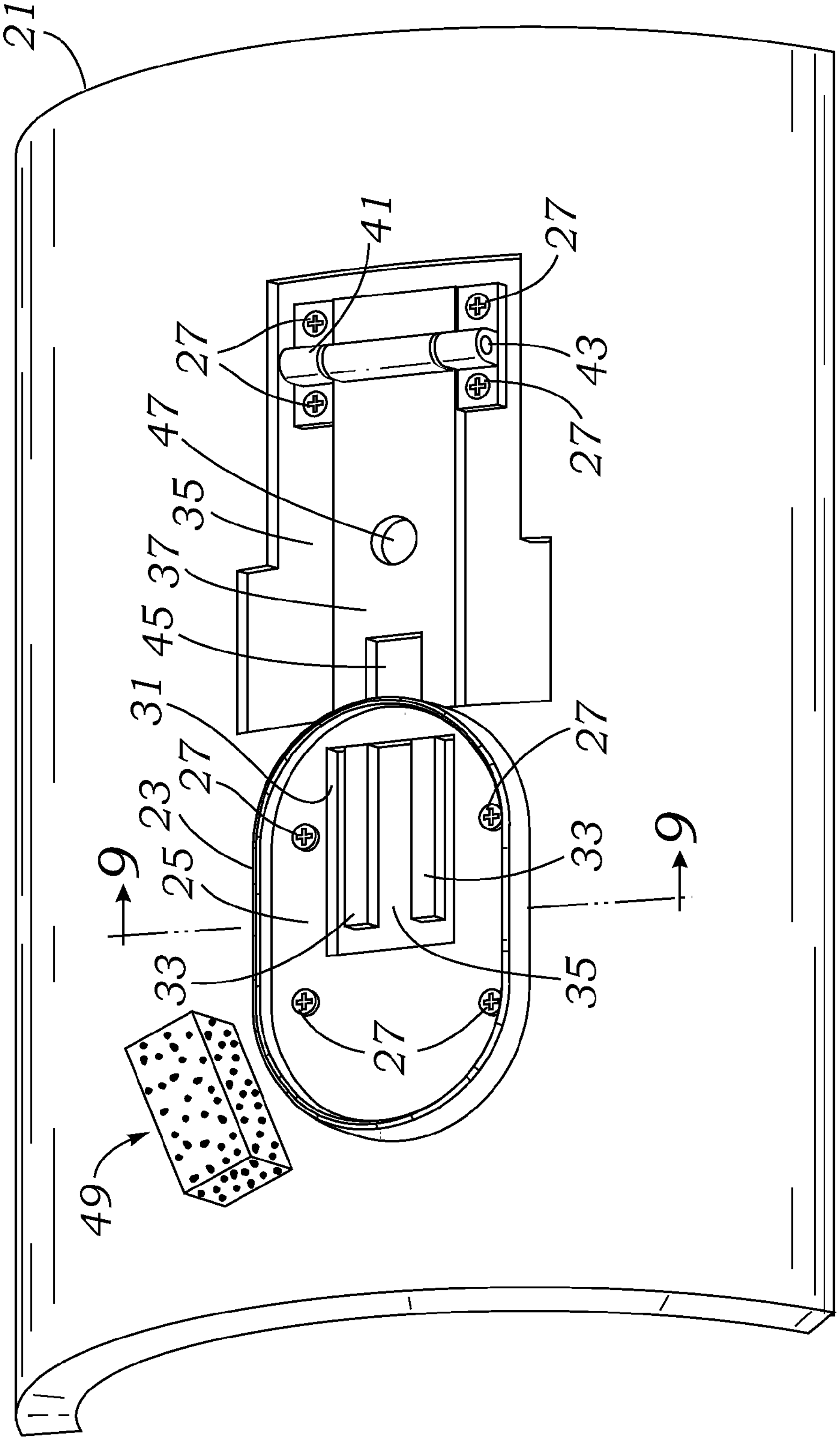
FIG. 1 is a perspective of but one example of the insert of the invention used inside a die board cut out ruled cutting rule area and which has a cutaway to accommodate a scrap rejection mechanism.

Referring to FIG. 1, a perspective view of but one configuration of the use of the insert of the invention is illustrated. Within a curved blanking die roll section 21 which is made of a thickness of material, such as wood, polymer, fiber board or the equivalent. Curved blanking die roll section 21 may be of the type to fit onto a curved cutting die panel drum of a high speed Mitsubishi Evol rotary die cutter (not shown) and will turn opposite an anvil drum (also not shown). The view of FIG. 1 is an outside view of the curved blanking die roll section 21 showing the mounting of a die cutting rule 23 which may be a mounted in and carried by a thin laser formed slot in the curved blanking die roll section 21. The shape of the mounting of a die cutting rule 23 shown in FIG. 1 is that of an elongated circle or racetrack shape, typically used to cut box hand holds to facilitate grasping and carrying of a box manually from the outside.

Just inside the inner periphery of die cutting rule 23, an insert 25 is seen. The insert 25 fits closely adjacent the inner periphery of die cutting rule 23 and may form a close and supporting fit to support the die cutting rule 23. A series of four screws 27 are seen which attach the insert 25 directly to the material of the curved die cut cylinder section 21. On the right portion of insert 25, a rectangular "C" shaped cutout 31 is seen to permit operation of a pair of scrap rejection levers 33 to operate within the inner periphery of die cutting rule 23 to directly push scrap directly from within the die cutting rule 23 at the time that the die cutting rule 23 has sufficiently cleared an anvil roller (not shown).

Just to one side of the die cutting rule 23, a cutout depression 35 is seen. The cutout depression 35 extends within the periphery of the inside the die cutting rule 23 and is generally coextensive with and matches the rectangular "C" shaped cutout 31 of the insert 25. The cutout depression 35 provides for movement of the pair of scrap rejection levers 33 between a lower position preferably touching the cutout depression 35, and an upper position where the pair of scrap rejection levers 33 extend upward near the uppermost extent, and perhaps beyond the top of the cutting rule 23. The angular movement is small and the cutout depression 35 should be sufficiently deep to enable the pair of scrap rejection levers 33 to pivot without knocking against the lower edge of the cutting rule 23 as it extends across the cutout depression 35.

Beyond the periphery of the die cutting rule 23, the cutout depression 35 opens and takes on a shape sufficient to support the middle and end of a scrap ejector lever arm 37. The scrap ejector lever arm 37 supports the scrap rejection levers 33. At the distal end of the scrap ejector lever arm 37, opposite the pivot arms 33, a hinge 41 which is secured by screws 27 enables a pivot pin 43 which is attached to or attached through the distal end of the scrap ejector lever arm 37 to pivotally operate. The combination of a scrap rejection lever 33, scrap ejector lever arm 37, hinge 41, and pivot pin 43 may be referred to collectively as a scrap ejector mechanism is not limited to the mechanical components or connectivity illustrated in FIG. 1. The structure of the scrap ejector lever arm 37 may have part of its weight cut away, including a slot 45 to define the pair of scrap rejection levers 33, and one or more circular apertures 47 to control weight and other characteristics of the scrap ejector lever arm 37.

Also seen and illustrated by representation, is a foam block 49, also sometimes known as product ejection rubber, which may be located about an area immediately adjacent the cutting rule 23 and which is used to urge the blanked corrugated fiberboard sheets away from the curved die cut cylinder section 21 as soon as the cutting rule 23 leaves the compressive influence of the anvil cylinder (not shown) after perforative cutting of the cutting rule 23 occurs. Typically a plurality of the foam blocks 49 will be present, will be fixably placed about the periphery of the cutting rule 23, but will typically not be placed within the confines of the cutout depression 35. Foam blocks 49 may also preferably be made of closed cell rubber or elastomer so that entrapped air can resist the natural tendency of foam rubber to be weakened in its resiliency and ability to spring back to assist removal of processed material from the vicinity of the cutting rule 23.

Figure 2:
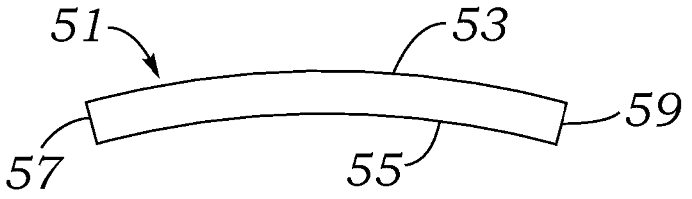
FIG. 2 is a side view of a plain insert showing the slight curvature between the ends and in which no formed cutaway is illustrated.

Referring to FIG. 2, a side view of a plain insert 51 having no formed cutaway 31 is illustrated. The plain insert 51 may have a cutaway formed should it be necessary to employ it with a scrap ejector. It may be that for spacing considerations on the curved die cut cylinder section 21, that the same size and shape cutting rule 23 may have a different approach from a different side and occupancy of the scrap rejection levers 33 and thus any shaped cutout 31 (whether or not "C" shaped) would dictate cutting an accommodation space in the plan in insert 51 in different places based upon location and operation.

Figure 3:
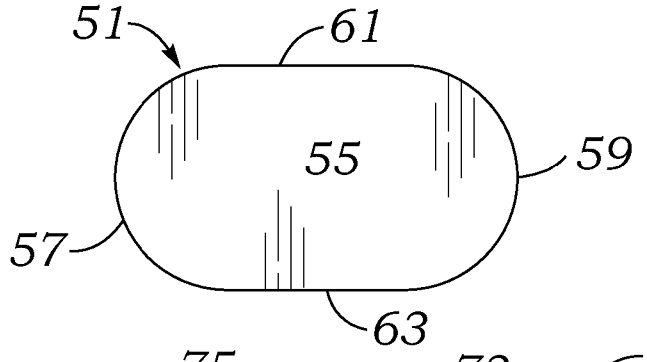
FIG. 3 is a top of the plain insert of FIG. 2 and illustrating its other dimensions of the plain insert.

The plain insert 51 is seen as having an outwardly facing or outer surface 53 and an inwardly facing or inner surface 55. The view of FIG. 2 illustrates the slight curvature between a first end 57 and a second end 59. The curvature occurs between the ends 57 and 59 as the plain insert 51 will move in an arced path on a die cut cylinder in a direction between ends 57 and 59. The finish on surface 55 is not important, perhaps other than being non-interferingly flat as it will likely oppose the outer surface of curved die cut cylinder section 21. Referring to FIG. 3, a top view of the no-cutaway, plain insert 51 is illustrated. The plain insert 51 also has a side 61 and a side 63 opposite side 61. The view of FIG. 3 is equivalent to a bottom view.

Figure 4:
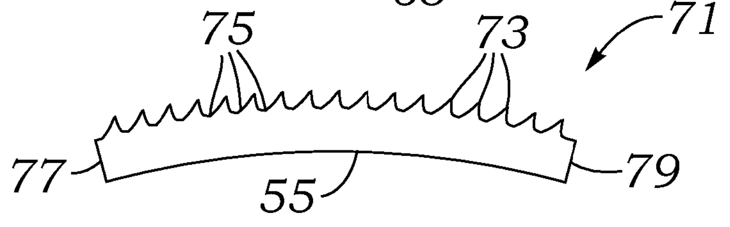
FIG. 4 is a side view of a shaped surface insert having no formed cutaway, but having an upper surface having a series of ribs defined against grooves which have a saw-tooth side profile.

Referring to FIG. 4, a side view of a shaped surface insert 71 having no formed cutaway 31, but having an upper surface having a series of ribs 73 defined against grooves 75 having a somewhat saw-tooth side profile, is illustrated. The saw teeth shaped ribs 73 have a relatively high peak to valley profile with respect to the grooves 75, and can perform a compression of material with some compressive folding into the grooves 75. The ribs 73, in terms of the lateral profile of FIG. 4 have a tilt toward one side such that each rib 73 is closer to a groove 75 on one side than the groove 75 on the other side. The shaped surface insert 71 is also seen as having an inner surface 55 which is the same as was the case for plain insert 71.

Also seen is the slight curvature between a first end 77 and a second end 79. The curvature occurs between the ends 77 and 79 as the shaped surface insert 71 in the same manner as was the case for plain insert 51 and it will move in an arced path on a die cut cylinder in a direction between ends 57 and 59. However, given the non-bilaterally similar orientation of the ribs 73 and grooves 75 seen in FIG. 4, the shaped surface insert 71 can be turned to travel with end 77 leading or with end 79 leading in order to reverse the rotational orientation of the rib 73 and groove 75 orientation.

Figure 5:
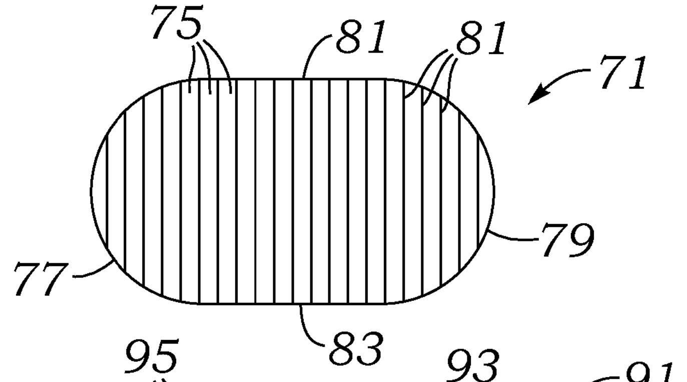
FIG. 5 is a top view of shaped surface insert seen in FIG. 4 and illustrating the distribution of lines and the extent of the sides of the insert of FIG. 4.

Referring to FIG. 5, a top view of shaped surface insert 71 is shown. Insert 71 is also seen to have a side 81 and a side 83 opposite side 81. The selection of the degree to which ribs 73 tilt toward one of the grooves 75 more than the other can be preselected, as well as the height of t ribs 73 with respect to the grooves 75. In some applications, where this degree of depth seen in FIG. 4 is desired, it may be possible to reverse direction of the shaped surface insert 71 to optimize performance.

Figure 6:
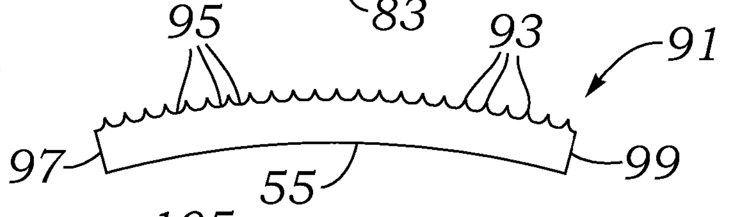
FIG. 6 illustrates a side view of a shaped surface insert shown as having an upper surface having a series of ribs defined against grooves having a much more shallow relationship than the ribs and grooves of the insert seen in FIGS. 4 and 5.

Referring to FIG. 6, a side view of a shaped surface insert 91 is shown as having an upper surface having a series of ribs 93 defined against their adjacent grooves 95 as having a much more shallow relationship than the ribs 73 and grooves 75 seen in FIG. 4. The grooves 95 are flat and exist between adjacent isosceles triangle or pyramid shaped ribs 93 having a pyramid base of about the same width as the grooves 95, and a height about the same as its pyramid base, taken from the lateral view of FIG. 6. This creates a space in which the upwardly projecting isosceles triangular volume is about one fourth of the potential volume occupied, or conversely where about three quarters of the volume is missing. A top view will be only slightly similar to the top view seen in FIG. 5 and will be omitted for brevity, with the sides 81 and 83 which were seen in FIG. 5 being present in all of the inserts of FIGS. 6, 7, & 8 although not being seen in those views. The curvature occurs between an end 97 and 99 as the shaped surface insert 71 in the same manner as was the case for plain insert 51 and it will move in an arced path on a die cut cylinder in a direction between ends 97 and 99. However, given the bilaterally similar orientation of the ribs 93 and grooves 95 seen in FIG. 4, the shaped surface insert 91 will be equivalent regardless of whether end 97 is leading or whether end 99 leading.

Figure 7:
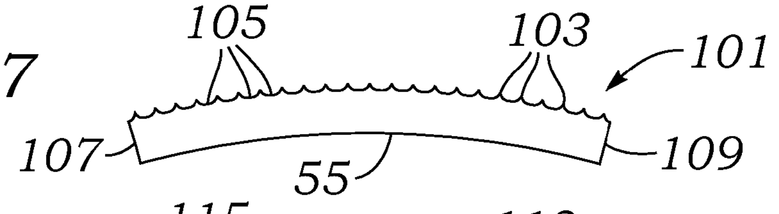
FIG. 7 is a side view of a shaped surface insert and is shown as having an upper surface having a series of ribs defined against grooves and having a much more shallow relationship than the ribs and grooves seen in the insert of FIG. 6.

Referring to FIG. 7, a side view of a shaped surface insert 101 is shown as having an upper surface having a series of ribs 103 defined against grooves 105 having a much more shallow relationship than the ribs 93 and grooves 95 seen in FIG. 6. The ribs 103 are trapezoidally shaped and the grooves 105 are flat spaces between the trapezoidal ribs. The overall result is a much gentler and less pronounced profile of the ribs 103 with respect to the grooves 105 as taken from the lateral view of FIG. 7. A top view will be slightly similar to the top view seen in FIG. 5 and will be omitted for brevity. The curvature occurs between an end 107 and an end 109 as before, and given the bilaterally similar orientation of the ribs 73 and grooves 75 seen in FIG. 7, orientation does not matter.

Figure 8:
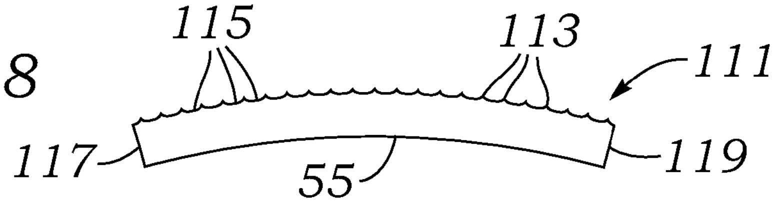
FIG. 8 is a side view of a shaped surface insert and is shown as having an upper surface having a series of ribs defined against grooves and having a much more shallow relationship than the ribs and grooves seen in the insert of FIG. 6.

Referring to FIG. 8, a side view of a shaped surface insert 111 is shown as having an upper surface having a series of ribs 113 defined against grooves 115 having a much more shallow relationship than the ribs 103 and grooves 105 seen in FIG. 7. Laterally viewed, the ribs 113 are a trapezoidally widened shape with shallow height, and the grooves 115 are flat spaces between the trapezoidal ribs 113. Each of the trapezoidally widened and shallow height ribs have a base that is generally equivalent to with width of the grooves 115. The overall result is an even much more gentler and less pronounced profile of the ribs 113 with respect to the grooves 115. It has been discovered that for some types of paper or fibrous material that a lower profile can work more efficiently in assisting in the rejection of scrap in a more precise zone of operation of the machinery used. It has been discovered that for some types of paper or fibrous material that a lower profile, such as the lower profile shapes seen in FIGS. 7 and 8 as inserts 101 and 111 can work more efficiently in assisting in the rejection of scrap in a more precise zone of operation of the machinery used.

Figure 9:
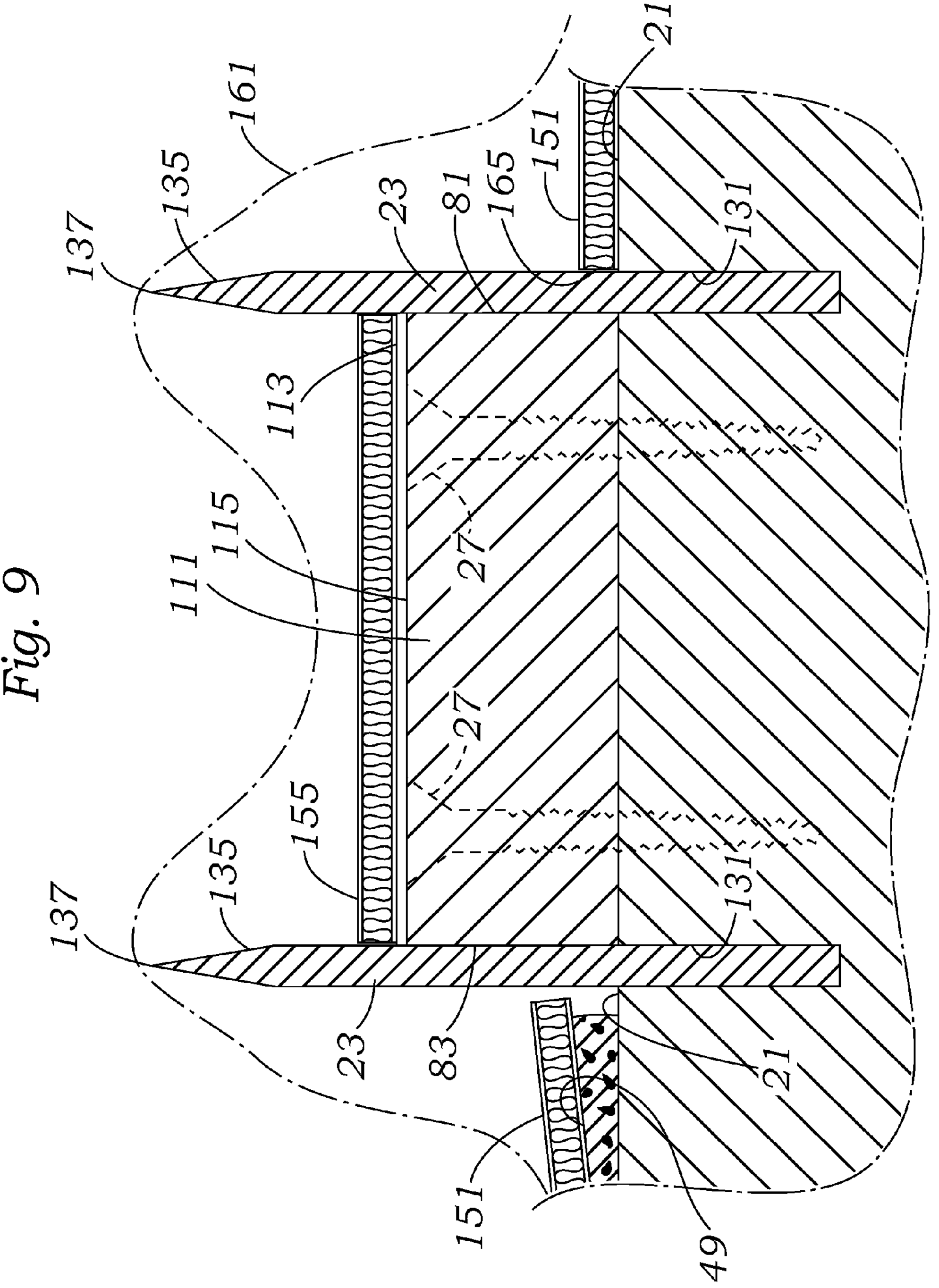
FIG. 9 is a sectional view taken along line 9-9 of FIG. 1 and illustrating the relationship of the inserts of FIGS. 1-8 and the support lent to the cutting rule.

Referring to FIG. 9, a sectional view taken along line 9-9 of FIG. 1 illustrates the relationship of the inserts 25, 51, 71, 91, 101 and 111 of FIGS. 1-8, although insert 111 is shown for illustration. FIG. 9 shows the support which insert 111 lends to the cutting rule 23. New details seen in FIG. 9 include a cutting rule slot 131 which stably holds the cutting rule 23. Cutting rule slot 131 may be formed by laser cut so that the cutting rule 23 can be inserted with a high friction fit. As can be seen, the sides 61 and 63 of the insert 111 fit closely in a laterally supporting position against the cutting rule 23.

FIG. 9 only has gaps, including between the cutting rule 23 and the cutting rule slot 131 and the insert 111 in order to use numbering and lead lines to accurately identify the structures shown in FIG. 9. In fact, depending upon the cutting device used to form the cutting rule slot 131, it may also be used to form the outer periphery of the insert 111. If the cutting rule slot 131 and the inserts 25, 51, 71, 91, 101 and 111 were cut together, quite complex shapes could be handled without the need to trim and optimize the inserts 25, 51, 71, 91, 101 and 111.

Also seen in FIG. 9, is a slight beveled surface 135 near an upper edge 137 of the cutting rule 23. The beveled surface indicates sharpness but need not be a simple beveled surface. The upper edge of the cutting rule 23 can be serrated, and may have a surface having uneven features along the edge 137.

Also seen in FIG. 9 for the first time are sections of corrugated fiberboard sheet material as it would appear during the die cutting operation. This includes a processed corrugated fiberboard sheet material 151 which is seen lying outside the cutting die 23 area, and a scrap corrugated fiberboard sheet material 155 which is seen lying inside the cutting die 23 area and elevatably supported by the insert 111. The position of the processed corrugated fiberboard sheet material 151 and scrap corrugated fiberboard sheet material 155 is seen in a position as it would appear when the curved die cut cylinder sections 21 would be under pressure from an elastomeric surface of an anvil die 161 which is shown in dashed line format and rather more loosely distributed than it would be under high pressure cutting operation, but only for ease of numbering and illustration. Only a single foam block 49 is shown for simplicity and it is shown in compressed condition.

The view of FIG. 9 illustrates that the main separating action in terms of force and shear occurs outside the cutting rule 23. Depending upon the thickness of the sheet material 151, 153 and the area circumscribed by the cutting rule 23 it can be seen that the cleanest enforced cut occurs outside the cutting rule 23. Where the area circumscribed by the cutting rule 23 is small, it is unclear whether the anvil die 161 can adequately press down upon the scrap corrugated fiberboard sheet material 155 and may cause ripping, tearing, or an uneven laying down of the scrap corrugated fiberboard sheet material 155 within the space which would otherwise not be occupied by the insert 111 were it not present.

Once the anvil die 161 moves away from the curved die cut cylinder sections 21, the foam block 49 begins to decompress and push the processed corrugated fiberboard sheet material 151 away from the curved die cut cylinder sections 21 causing a formed aperture 165 in the processed corrugated fiberboard sheet material 151 to move beyond the edge 137 of the cutting die 23, to clear the cutting rule 23. Because the insert 111 enabled the scrap corrugated fiberboard sheet material 155 to be cut evenly and to be effectively compressed by the anvil die 161, and perhaps even deformed and partially held by insert 111, it has been shown that the scrap corrugated fiberboard sheet material 155 will remain stably in place until ejected by at least one scrap rejection lever 33.

Note that the rectangular "C" shaped cutout 31 of FIG. 1 was oriented to leave as much of the inserts 25, 51, 71, 91, 101 and 111 intact along the inner periphery of the cutting rule 33 both to support the cutting rule 33 and to provide compressive support for a clean cut for as much of the scrap corrugated fiberboard sheet material 155 as possible. Adjustment of the heights of the ribs 73, 93, 103, and 113 with respect to the grooves 75, 95, 105 and 115, taking consideration of the characteristics of the fiberboard sheet material 151, 155, will enable the scrap fiberboard sheet material 155 to be deformed enough to draw in and support the peripheral edge of the scrap fiberboard sheet material 155 to attain a clean cut, while providing stable holding within the periphery of the cutting rule 23 for ejection at the proper time. It is understood that any supportive structure placed within the inner area of a cutting rule 23 and elevated with respect to the curved die cut cylinder sections 21 outside the outer area of a cutting rule 23 will tend to accomplish and support the structures, goals and objectives of the present invention.

While the present invention has been described in terms of a hard insert for use with die cutting machinery, and in particular a specified thickness of hard material to limit the extent to which fibrous cutouts can be pressed into an area within a die cutting rule, the structure and process of the invention can be realized in many different types of embodiments and combination.

Although the invention has been derived with reference to particular illustrative embodiments thereof, many invention changes and modifications may become apparent to those skilled in the art without departing from the broad spirit and scope of the invention. Therefore, included within the patent warranted hereon are all such changes and modifications reasonably and properly be included within the scope of this contribution to the art.

What is claimed:

1. An insert for a blanking die of a rotary die cutter comprising:

a body having a curved lower surface for fitting onto a cylindrical blanking die, and an upper surface, and having a shape for fitting closely adjacent and supporting a cutting rule and for assisting in the retention of scrap corrugated fiberboard sheet material.

2. The insert as recited in claim 1 wherein the upper surface carries an alternating series of ribs and grooves to increase retention of scrap corrugated fiberboard sheet material.

3. The insert as recited in claim 2 wherein alternating series of ribs and grooves have a lateral saw tooth shape.

4. The insert as recited in claim 2 wherein alternating series of ribs and grooves have a lateral triangular shape.

5. The insert as recited in claim 2 wherein alternating series of ribs and grooves have a lateral trapezoidal shape.

6. The insert as recited in claim 1 wherein the body includes a cutout to accommodate scrap rejection lever.

7. A blanking die section for mounting on a rotary die cutter comprising:

a curved die cut cylinder section for supporting at least one die cutout area;

a cutting rule extending partially into and supported by the curved die cut cylinder section and arranged to form a cutout area; and a raised portion, within the cutout area and higher than a height of the curved die cut cylinder section outside of the cutout area.

8. The blanking die section as recited in claim 7 wherein the raised portion is an insert fitted closely adjacent at least part of the cutting rule.

9. The blanking die section as recited in claim 7 and further comprising a foam block attached to the curved die cut cylinder section and adjacent and outside the cutting rule.

10. The blanking die section as recited in claim 9 wherein the foam block is a closed cell elastomer.

11. The blanking die section as recited in claim 7 and further comprising a scrap ejector mechanism associated with the blanking die section.

12. The blanking die section as recited in claim 11 wherein the raised portion is an insert fitted closely adjacent at least part of the cutting rule and wherein the insert is partially cut away to accommodate the scrap ejector mechanism.

13. The blanking die section as recited in claim 7 and wherein the raised portion occupies a percentage height, with respect to the distance from the height of the supporting curved die cut cylinder section to the top of the exposed cutting rule is from about 25.51% to about 89.28%.

14. The blanking die section as recited in claim 7 and wherein at least a part of the raised portion is immediately adjacent the cutting rule provides a degree of added lateral support afforded the cutting rule of from about twenty percent to about eighty seven and a half percent additional lateral support.

* * * * *